A. W. SWEENY.
Fruit-Dryers.
No. 153,131.  Patented July 14, 1874.
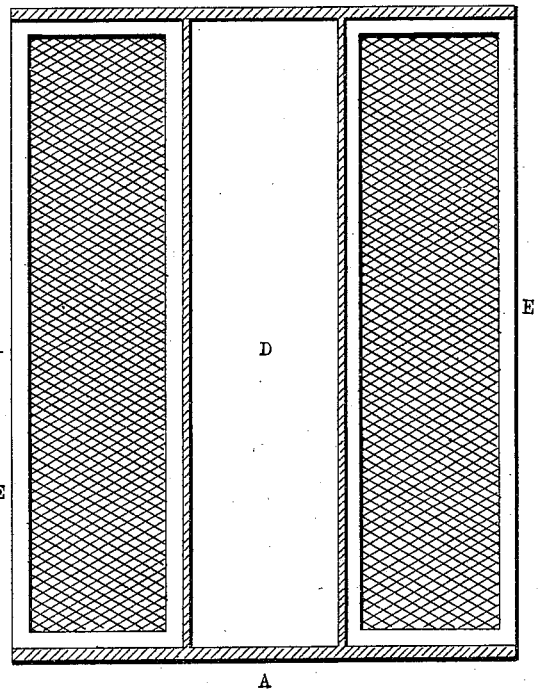
FIG. II.
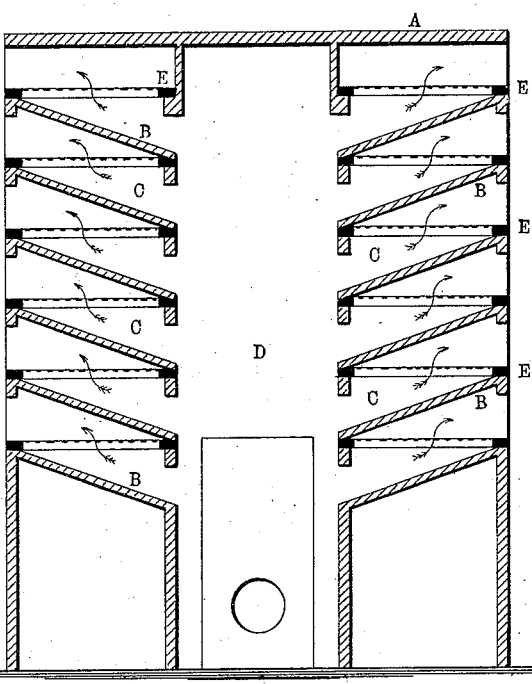
FIG. I.
WITNESSES  
Frank Orur  
W. W. Wharton
INVENTOR  
Augustus W. Sweeny  
by G. H. & N. S. Howard  
attys.
THE GRAPHIC CO. PHOTO-LITH. 39 & 41 PARK PLACE, N.Y.

UNITED STATES PATENT OFFICE.

AUGUSTUS W. SWEENY, OF LAKE ROLAND, MARYLAND.

IMPROVEMENT IN FRUIT-DRIERS.

Specification forming part of Letters Patent No. 153,131, dated July 14, 1874; application filed April 9, 1874.

*To all whom it may concern:*

Be it known that I, AUGUSTUS W. SWEENY, of Lake Roland, in the county of Baltimore and State of Maryland, have invented certain Improvements in Fruit-Driers, of which the following is a specification; and I do hereby declare that in the same is contained a full, clear, and exact description of my said invention, reference being had to the accompanying drawing and to the letters of reference marked thereon.

My invention relates to a square or rectangular chamber having a novel arrangement of hot-air flues extending in an inclined position to the exterior of the chamber; to a system of perforated trays fitted to rest within the said flues, upon which the fruits or vegetables to be desiccated are placed; and to other features hereinafter described, by which different kinds of fruit, or fruit and vegetables, can be operated upon at the same time without any intermingling of vapors or odors, or blending of flavors.

In the further description of my invention which follows, due reference must be had to the accompanying drawing forming a part of this specification, and in which—

Figure 1 is a vertical section of my improved fruit-drier; and Fig. 2, a plan of the same, the top of the casing being removed.

Similar letters of reference indicate similar parts in both figures.

A is a square or rectangular box, forming the outside casing of the drier. B B are partitions of boards or canvas, placed in an inclined position within the box, and extending downward from the exterior of the said box, which is open at this point to a position at some distance from the vertical center. The openings between the partitions constitute the flues, which are represented by C, in which rest the trays hereinafter described. The space D, formed in the center of the casing between the two sections of flues, is used as a heating-chamber, in which is located the heating apparatus, such as a stove or hot-air pipe leading from some heating apparatus without the drier. E E are trays, perforated at the bottom, or constructed of a frame or skeleton-tray covered by some interstitial fabric. The trays are of a uniform size and shape, so as to be interchangeable, and are so arranged, with reference to the flues and partitions, as to be perfectly isolated from each other. The trays are supported upon strips in a horizontal position, and are removable only from the outside of the drier.

By reference to Fig. 1 it will be seen that each tray, with the exception of the top ones, is covered by the partition directly above it, and that the removal of one or several of the trays does not render the drier inoperative.

The heating-chamber is entered by means of a door, and in case a stove is used as the means of generating heat apertures are provided in the door, or at some part of the casing, to supply air to support combustion and give the necessary drying currents. The direction of the hot-air currents is shown by the arrows; and it will be observed that the air passing through or among the fruit in a tray absorbing the moisture is not utilized a second time, thus preventing the odor or flavor from one tray being transmitted to another.

Having thus described my invention, what I claim as new, and desire to secure Letters Patent of the United States, is—

The central vertical drying-chamber D, having a series of isolated flues, C, extending at an upward incline therefrom at either side thereof to the open sides of the drier-casing, each flue being provided with a removable interstitial tray, E, substantially as and for the purposes specified.

AUGUSTUS W. SWEENY.

Witnesses:
WM. T. HOWARD,
JNO. S. MADDOX.